(12) United States Patent
Kahler et al.

(10) Patent No.: US 6,640,799 B2
(45) Date of Patent: Nov. 4, 2003

(54) ADJUSTABLE SEARING GRATE

(75) Inventors: Andrew Kahler, Fortson, GA (US); Alan Cummings, Opelika, AL (US); Ryan Neal, Midland, GA (US)

(73) Assignee: W. C. Bradley Company, Columbus, GA (US)

( * ) Notice: Subject to any disclaimer, the term of this patent is extended or adjusted under 35 U.S.C. 154(b) by 0 days.

(21) Appl. No.: 10/163,067

(22) Filed: Jun. 5, 2002

(65) Prior Publication Data

US 2002/0179082 A1 Dec. 5, 2002

Related U.S. Application Data

(60) Provisional application No. 60/296,052, filed on Jun. 5, 2001.

(51) Int. Cl.$^7$ .............................. F23H 17/08
(52) U.S. Cl. ................ 126/41 R; 126/153; 126/152 B
(58) Field of Search ............... 126/41 R, 25 R, 126/152 B, 153, 9 R, 9 B; 211/181.1, 175

(56) References Cited

U.S. PATENT DOCUMENTS

| | | | | |
|---|---|---|---|---|
| 2,549,709 A | * | 4/1951 | Potts ........................... | 99/449 |
| 3,316,864 A | * | 5/1967 | Maslow ....................... | 108/148 |
| 3,555,994 A | | 1/1971 | Nemetz et al. ............... | 99/444 |
| 3,585,922 A | * | 6/1971 | Peterson et al. ............. | 99/355 |
| 3,998,170 A | * | 12/1976 | Gordon ....................... | 108/91 |
| 4,178,844 A | | 12/1979 | Ward et al. .................. | 99/449 |
| 4,403,541 A | | 9/1983 | Berger ........................ | 99/385 |
| 4,428,281 A | | 1/1984 | Miller ......................... | 99/445 |
| 4,434,780 A | | 3/1984 | Hepner .......................... | 126/9 |
| 4,553,523 A | | 11/1985 | Stohrer .......................... | 126/9 |
| RE32,288 E | | 11/1986 | Berger ........................ | 99/385 |
| D291,646 S | | 9/1987 | Koziol ....................... | D7/332 |
| 4,703,746 A | | 11/1987 | Hitch .......................... | 126/25 |
| 5,105,725 A | | 4/1992 | Haglund ...................... | 99/446 |
| 5,133,333 A | * | 7/1992 | Stout ....................... | 126/25 R |
| 5,355,780 A | | 10/1994 | Campbell .................... | 99/450 |
| 5,363,751 A | | 11/1994 | Prestigiacomo ............. | 99/444 |
| 5,437,221 A | | 8/1995 | Schwöd ....................... | 99/449 |
| D364,995 S | | 12/1995 | Koziol ........................ | D7/409 |
| 5,515,839 A | * | 5/1996 | Phillips .................... | 126/9 R |
| 5,520,118 A | * | 5/1996 | McCarthy .................... | 108/42 |
| 5,974,954 A | | 11/1999 | Rigney et al. ................ | 99/396 |
| RE36,464 E | | 12/1999 | O'Brien et al. .............. | 99/446 |
| 6,189,527 B1 | | 2/2001 | Walsh et al. .................. | 126/25 |
| 6,279,467 B1 | | 8/2001 | Tiemann ..................... | 99/426 |

FOREIGN PATENT DOCUMENTS

GB 2 156 201 A 10/1985 ...................... 37/6

* cited by examiner

*Primary Examiner*—Alfred Basichas
(74) *Attorney, Agent, or Firm*—James W. Kayden; Thomas, Kayden, Horstemeyer & Risley, LLP

(57) ABSTRACT

An adjustable searing grate for a barbecue grill comprises a cooking surface and an outrigger device. The cooking surface comprises a plurality of searing wires arranged in a substantially parallel configuration and a longitudinal member disposed substantially perpendicularly to the plurality of searing wires. Each of the plurality of searing wires has a substantially oval cross-section. The longitudinal member supports the plurality of searing wires. The outrigger device is adapted to slidably engage the cooking surface. The outrigger device is slidably fixed along one of the plurality of searing wires and the longitudinal member in order to adjust a dimension of the adjustable searing grate.

13 Claims, 3 Drawing Sheets

ADJUSTABLE SEARING GRATE

CROSS-REFERENCE TO RELATED APPLICATION

This application claims priority to copending U.S. provisional application entitled, "Adjustable Searing Grate," having Ser. No. 60/296,052, filed Jun. 5, 2001, which is entirely incorporated herein by reference.

TECHNICAL FIELD

The present invention is generally related to barbecue grills and parts therefor and more particularly is related to an adjustable searing grate.

BACKGROUND OF THE INVENTION

When preparing foods on barbecue grills, especially meats, it is often desirable to sear the outer surfaces of the foods early in the cooking process. By searing the outer surfaces of the foods, it is possible to seal in the naturally occurring juices of the foods as well as any marinade that may have been applied to the foods prior to cooking. Not too infrequently, foods prepared without searing tend to become "overcooked," or too dry.

Some prior art grates for use with barbecue grills are inadequate for the searing function. Typical prior art grates comprise a series of laterally spaced wires, positioned to support food products a given distance above a heat source while preventing the majority of food products from passing between the wires. Typically, these wires are circular in cross section, resulting in a very small portion of the food product actually contacting the surface area of the wires. As such, a very small portion of the outer surface of the food product is potentially seared. Because the amount of searing that can occur on these common prior art grates is minimal, it proves useless for keeping the food products moist throughout the remainder of the cooking process.

Attempts to compensate for the lack of searing that occurs with prior art grates include searing the food products with the heat source, i.e. the flames, and then moving the food products to a cooler portion of the grate surface. Numerous problems exist with this method of searing food products. To use this method of searing, typically, the barbecue grill must be heated to a level that is undesirable for cooking. Therefore, after searing the food products, the grill temperature must be lowered for effective cooking. This poses a significant problem for those using standard charcoal briquettes. Even when a gas or an electric grill is used, there is lag time between adjusting the grill controls and having the temperature of the grill actually reduced to an acceptable cooking temperature.

Another problem that exists with using high heat to sear food products is that it requires heightened attention from the user grilling food. In addition, because of the increased temperatures used to sear the food products with this method, flare-ups are a constant and increased possibility. Undoubtedly, many food products have been accidentally ruined when using high heat for searing.

SUMMARY OF THE INVENTION

Preferred embodiments of the present invention provide an adjustable searing grate for a barbecue grill. Briefly described, in architecture, one embodiment of the apparatus can be implemented as follows. An adjustable searing grate for a barbecue grill comprises a cooking surface and an outrigger device. The cooking surface comprises a plurality of searing wires arranged in a substantially parallel configuration and at least one longitudinal member disposed substantially perpendicularly to the plurality of searing wires. Each of the plurality of searing wires has a substantially oval cross-section. The longitudinal member supports the plurality of searing wires. The outrigger device is adapted to slidably engage the cooking surface. The outrigger device is slidably fixed along one of the plurality of searing wires and the longitudinal member in order to adjust a dimension of the adjustable searing grate.

Other systems and methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Figure 1:
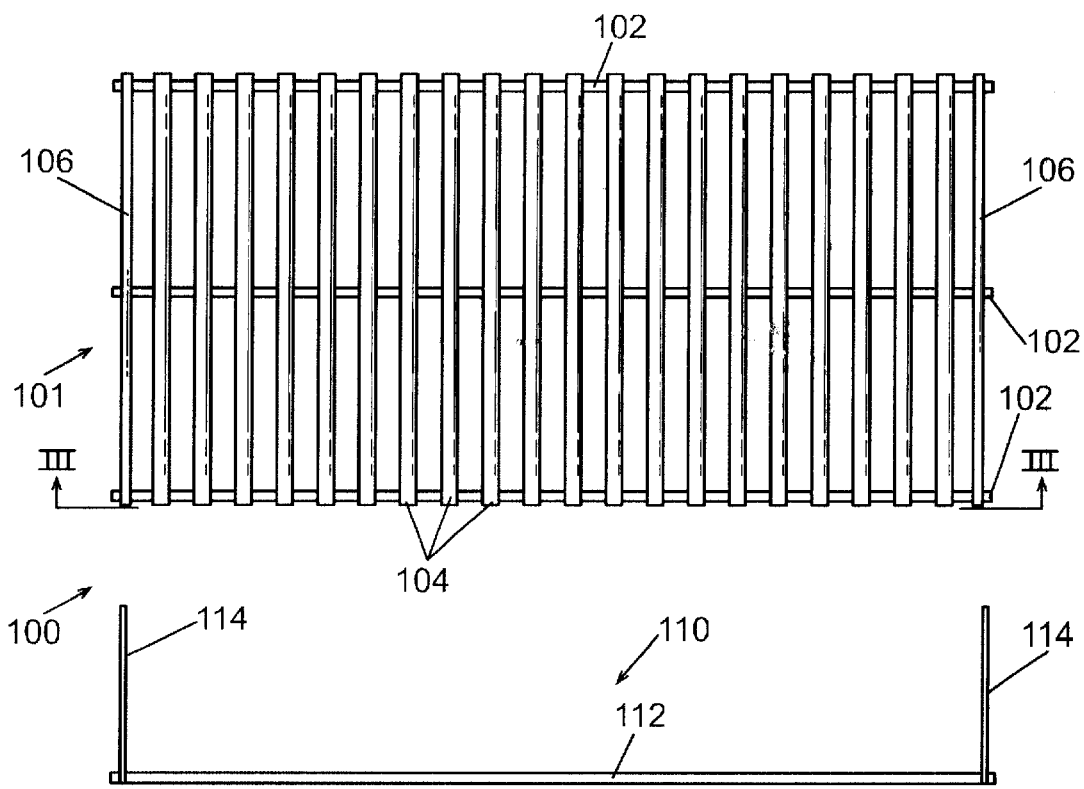
FIG. 1 is a top view of a searing grate of the present invention showing an unassembled state.

With general reference to FIG. 1, an adjustable searing grate 100 of the present invention comprises a cooking surface 101 and an outrigger device 110. The outrigger device 110 is adapted to slidably engage the cooking surface 101. Moving the outrigger device 110 slidably along the cooking surface 101 adjusts a dimension of the searing grate 100.

Referring more specifically to FIG. 1, the cooking surface 101 of the searing grate 100 comprises a plurality of longitudinal members 102 to which a plurality of searing wires 104 are attached. As shown, it is preferable that the plurality of longitudinal members 102 are arranged in a substantially parallel configuration. Similarly, the plurality of searing wires 104 are arranged in a substantially parallel configuration and substantially perpendicular to the longitudinal members 102, forming a grid. As shown, a pair of longitudinal members 102 are disposed at opposing ends of the searing wires 104. Another longitudinal member 102 is disposed transversing the plurality of searing wires 104 between the pair of longitudinal members 102 toward a center point of the searing wires 104. It should be noted that any number and configuration of longitudinal member 102 as well as searing wires 104 may comprise the cooking surface 101 of the present invention.

A pair of support tubes 106 (optional) are attached to the longitudinal members 102 such that the searing wires 104 are located therebetween. Each of the pair of support tubes 106 are hollow. The support tubes 106 can be hollow the full length thereof, or can be hollow for a partial length thereof. It should be noted that in an embodiment where the optional support tubes 106 are not included, one or more of the searing wires 104 can be hollow.

An outrigger device 110 comprises a support member 112 and a pair of support wires 114 attached thereto. The support member 112 is a substantially elongated, linear member having opposing ends. One support wire 114 is fixed on each opposing end of the support member 112 and extends therefrom such that the support wires 114 are substantially parallel and extending in the same direction. Each support wire 114 is a substantially elongated, linear member being adapted to fit inside the hollow interior of the support member 112. The support wires 114 are attached to the support member 112 such that they align, and can be inserted into, the support tubes 106. It should be noted that although the support tubes 106 and support wires 114 are illustrated and disclosed herein as being disposed toward the outermost edges of the cooking surface 101 and the support member 112, respectively, the support tubes 106 and the support wires 114 can be disposed in any desired position such that support wires 114 and the support tubes 106 are in alignment with each other.

Figure 2:
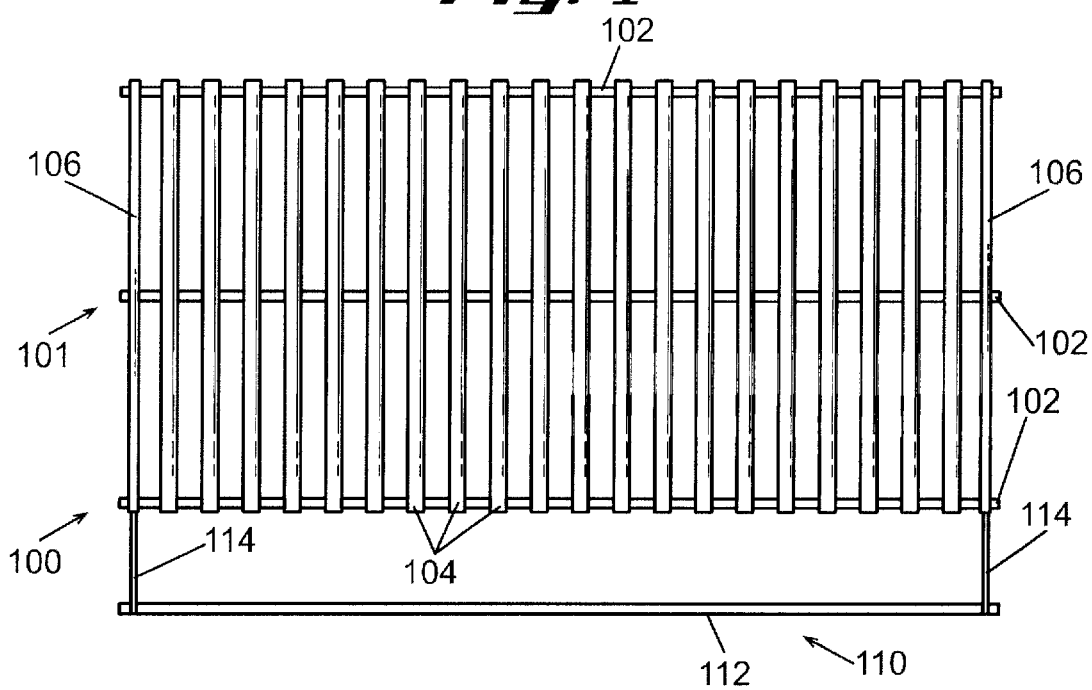
FIG. 2 is a top view of the searing grate shown in FIG. 1 as assembled.

FIG. 2 illustrates the outrigger device 110 inserted into the support tubes 106. As illustrated, the outrigger device 110 is partially expanded from the cooking surface 101. It should be noted, however, that the outrigger device 110 can be expanded or contracted to any distance from the cooking surface 101 permitted by the length of the support wires 114. The length of the support wires 114 is variable and can be selected with regard to the range of grill sizes into which the adjustable searing grate 100 will be able to fit. It should be noted that although the adjustable searing grate 100 is illustrated and disclosed herein as having a dimension adjustable in the direction of the length of the searing wires 104, an adjustable searing grate 100 can be adjustable in another dimension, for example a dimension along the length of the longitudinal members 102, either alternatively or concurrently, without departing from the spirit of the present invention.

The outrigger device 110 can be slidably attached to the cooking surface 101 in a variety of manners in addition to the slidable insertion of the support wires 114 into the support tubes 106, as disclosed above. For example, the support wires 114 can slidably engage a portion of the cooking surface 101 externally, such as by engaging a track or channel in the cooking surface 101 or surrounding a portion of the cooking surface 101 with a cuff, bracket, or the like.

Figure 3:
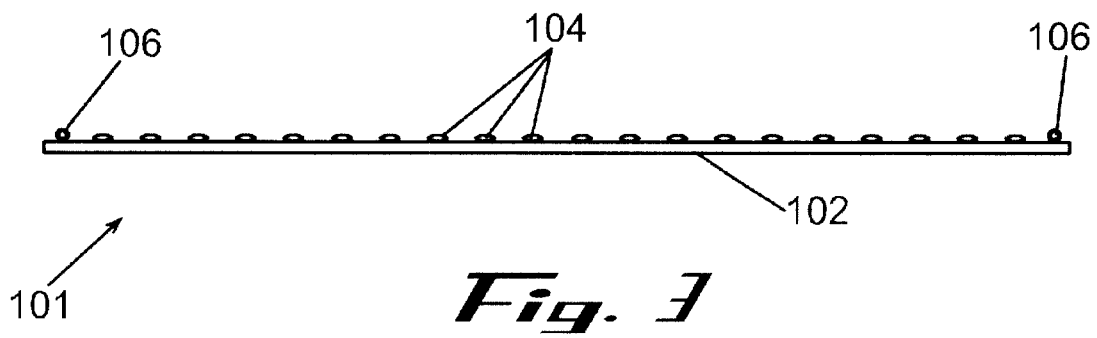
FIG. 3 is a side view of the searing grate shown in FIG. 1 along reference line III—III.

FIG. 3 illustrates a side view of the cooking surface 101 along reference line III—III of FIG. 1. The longitudinal members 102 are positioned below the searing wires 104. The searing wires 104 are spaced substantially equidistant along the length of the longitudinal members 102. The number of searing wires 104 and longitudinal members 102 can be varied and, as shown, the preferred embodiment is only intended to be a representative illustration. Also, any suitable materials can be used to construct the searing grate 100. However, preferred embodiments include steel construction with either chrome or porcelain enamel finish.

Figure 4:
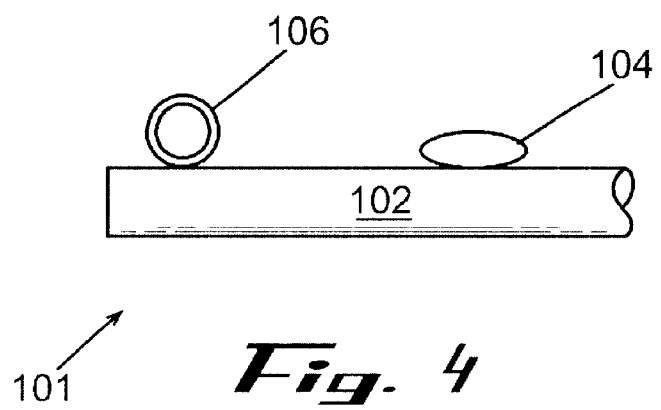
FIG. 4 is an enlarged side view of a portion of the searing grate shown in FIG. 3, showing greater detail of a support tube and a searing wire.

FIG. 4 shows greater detail of a cross-section of a searing wire 104 and a support tube 106. The searing wires 104 can be oval shaped, optionally with a rounded lower surface, or any configuration that provides an adequate searing surface for the food being cooked. It is preferable that the surface area of the searing wires 104 in combination with spacing between the searing wires 104 on the longitudinal members 102 create a cooking surface 101 that is conducive to searing foods without requiring excessive heat. It should also be noted that although the support tube 106 is illustrated as having a substantially circular cross-section, the support tube 106 can have any suitable cross-section. It is preferable that the support tube 106 have a larger diameter than the searing wires 104 such as to act as a "stop" to deter food from falling off of the cooking surface 101. It should be further noted that although the searing wire 104 is illustrated as having a substantially ovular cross-section, the searing wire 104 can have any suitable cross-section. Furthermore, the searing wire 114 can be either hollow or solid.

Figure 5:
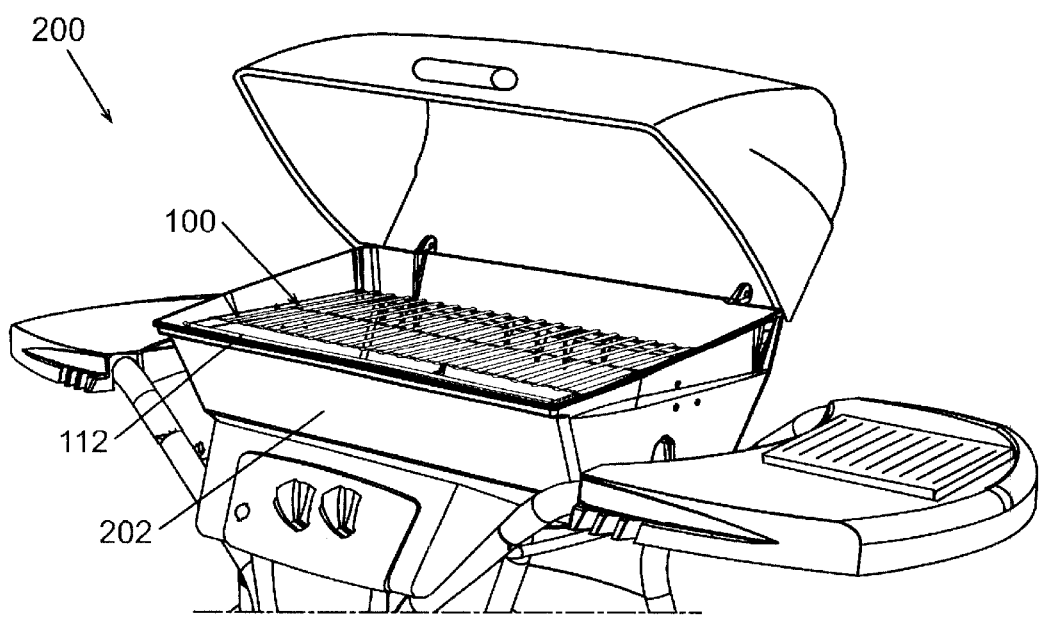
FIG. 5 is a perspective view of a searing grate of the present invention disposed in a barbecue grill.

FIG. 5 illustrates the adjustable searing grate 100 adjusted to appropriate size and disposed in a firebox 202 of a barbecue grill 200. As shown, and as stated above, the support wires 114 of the outrigger device 110 can be inserted into the support tubes 106 of the searing grate 100 to varying amounts. It is preferable that the support wires 114 are readily slidable within the support tubes 106 such that the searing grate 100 can be easily adjusted among the available dimensions. Once adjusted to the desired dimension, the support member 112 engages a portion of a grill firebox 202 and the furthest opposing longitudinal member 102 engages another portion of a grill firebox 202. In this configuration the searing grate 100 is suspended over a heat source disposed in the firebox 202 of the barbecue grill 200. The adjustable searing grate 100 of the present invention can be altered in dimension such that the searing grate 100 can fit into grills of varied shapes and sizes. It should noted that although adjustable searing grate 100 is illustrated herein as substantially rectangular in shape, it can be configured in any shape without departing form the spirit of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. An adjustable searing grate for a barbecue grill, comprising:
   a cooking surface, comprising:
      a plurality of searing wires arranged in a substantially parallel configuration, each of said plurality of searing wires having a substantially oval cross-section; and
      a longitudinal member disposed substantially perpendicularly to said plurality of searing wires, said longitudinal member supporting said plurality of searing wires; and
   an outrigger device adapted to slidably engage said cooking surface;
   wherein said outrigger device is slidable along one of said plurality of searing wires and said longitudinal member to adjust a dimension of the adjustable searing grate.

2. The adjustable searing grate of claim 1, wherein said cooking surface further comprises:
  a plurality of longitudinal members arranged in a substantially parallel configuration and being substantially perpendicular to said plurality of searing wires;
  wherein said plurality of longitudinal member supports said plurality of searing wires.

3. The adjustable searing grate of claim 1, wherein said outrigger device further comprises:
  a support member being substantially linearly elongated and having opposing ends; and
  a pair of support wires, a first of said pair of support wires being disposed toward one end of said support member, and a second of said pair of support wires being disposed toward an opposing end of said support member;
  wherein each of said pair of said support wires is adapted to slidably engage said cooking surface.

4. The adjustable searing grate of claim 1, wherein said searing wires comprise a surface area suitable for searing food when the adjustable searing grate is suspended over a heat source.

5. An adjustable searing grate for a barbecue grill, comprising:
  a cooking surface, comprising:
    a plurality of longitudinal members being arranged in a substantially parallel configuration, said plurality of longitudinal members being substantially linear and being defined by a length;
    a plurality of searing wires having a substantially oval cross-section and being arranged in a substantially parallel configuration having a space therebetween, and being disposed along the length of said plurality of longitudinal members such that said plurality of searing wires are arranged substantially perpendicular to said plurality of longitudinal members; and
    a pair of support tubes, wherein a first support tube of said pair of support tubes is arranged substantially parallel to said plurality of said searing wires and a second support tube of said pair of support tubes is arranged substantially parallel to said plurality of said searing wires;
    wherein said first support tube is disposed toward one end of said plurality longitudinal members and said second support tube is disposed toward an opposing end of said plurality longitudinal members; and
  an outrigger device, comprising:
    a support member being substantially elongated and defined by a length; and
    a pair of support wires being disposed at opposing ends of said support member, said pair of support wires adapted to slidably engage said support tubes of said cooking surface;
    wherein slideable movement of said support wires along said support tubes alters a dimension of the adjustable searing grate.

6. The adjustable searing grate of claim 5, wherein said support tubes are hollow and said pair of support wires slide into said support tubes.

7. The adjustable searing grate of claim 5, wherein said searing wires are suitable for searing food when suspended over a heat source.

8. A barbecue grill comprising:
  a firebox having a heat source disposed therein; and
  an adjustable searing grate comprising a plurality of searing wires having a substantially oval cross-section, and being adapted to engaged a portion of said firebox such that said adjustable searing grate is suspended over said heat source, said adjustable searing grate comprising:
    a cooking surface; and
    an outrigger device slidably engaging said cooking surface;
    wherein said outrigger device is slidably moved along a portion of said cooking surface until said adjustable searing grate engages a portion of said firebox such that the adjustable searing grate is suspended over the heat source.

9. The barbecue grill of claim 8, wherein said cooking surface further comprises:
  a plurality of longitudinal members being arranged in a substantially parallel configuration, said plurality of longitudinal members being substantially linear and being defined by a length;
  a plurality of searing wires being arranged in a substantially parallel configuration, each of said plurality of searing wires having a space therebetween, said plurality of searing wires being disposed along the length of said plurality of longitudinal members such that said plurality of searing wires are arranged substantially perpendicular to said plurality of longitudinal members; and
  a pair of support tubes, wherein a first support tube of said pair of support tubes is arranged substantially parallel to said plurality of said searing wires and a second support tube of said pair of support tubes is arranged substantially parallel to said plurality of said searing wires;
  wherein said first support tube is disposed toward one end of said longitudinal member and said second support tube is disposed toward an opposing end of said longitudinal member and said outrigger device is adapted to engage said pair of support tubes.

10. The barbecue grill of claim 8, wherein said outrigger device further comprises:
  a support member being substantially elongated and defined by a length; and
  a pair of support wires being disposed at opposing ends of said support member, said pair of support wires being adapted to slidably engage a portion of said cooking surface;
  wherein slideable movement of said outrigger device along said cooking surface alters a dimension of the adjustable searing grate.

11. The barbecue grill of claim 8, wherein said cooking surface is adapted to sear food over the heat source.

12. An adjustable searing grate for a barbecue grill, comprising:
  means for searing food over a heat source;
  means for retaining food on said searing grate;
  means for adjusting a dimension of said means for searing food; and
  means for movably fixing said means for adjusting a dimension to said means for searing food.

13. The adjustable searing grate of claim 12, wherein said means for movably fixing comprises slidably fixing said means for adjusting to said means for searing.

* * * * *